United States Patent [19]

Cornell

[11] 4,269,303
[45] May 26, 1981

[54] WOOD CONVEYOR APPARATUS

[76] Inventor: Cyrus J. Cornell, P.O. Box 18, Laceyville, Pa. 18623

[21] Appl. No.: 745,579

[22] Filed: Nov. 29, 1976

Related U.S. Application Data

[63] Continuation of Ser. No. 601,267, Aug. 4, 1975, abandoned.

[51] Int. Cl.³ .................... B65G 15/12; B65G 17/38
[52] U.S. Cl. .............................. 198/688; 198/817; 198/835
[58] Field of Search ............... 198/850, 861, 817, 834, 198/835, 688, 393, 443, 616, 842; 74/245 C

[56] References Cited

U.S. PATENT DOCUMENTS

| | | | |
|---|---|---|---|
| 1,587,896 | 6/1926 | Butterworth | 198/208 UX |
| 1,868,538 | 7/1932 | McKee et al. | 198/817 |
| 2,199,688 | 5/1940 | Boldt | 198/834 X |
| 2,608,288 | 8/1952 | Talbot | 198/726 |
| 2,738,765 | 3/1956 | Hart | 198/834 |
| 2,763,458 | 9/1956 | Kindseth | 198/817 X |
| 3,477,559 | 11/1969 | Raasch | 198/616 X |

Primary Examiner—Robert B. Reeves
Assistant Examiner—Douglas D. Watts
Attorney, Agent, or Firm—Richard G. Stephens

[57] ABSTRACT

A conveyor for transporting wood slabs and the like comprises a plurality of spaced-apart rails each carrying an endless loop of chain routed around a respective drive sprocket and an idler roller and a plurality of further idler rollers support the upper course of the chain above the upper edges of the rails. Each chain comprises inter-linked oval links, so that the links lie in perpendicular planes, with links lying in vertical planes extending into recesses in the sprockets and idler rollers.

16 Claims, 11 Drawing Figures

WOOD CONVEYOR APPARATUS

This application is a continuation of my prior copending Application Ser. No. 601,267 filed Aug. 4, 1975 now abandoned.

My invention relates to apparatus for handling elongated pieces of lumber such as cants or slabs or flitches, and more particularly to an improved chain arrangement for use on live decks, unscramblers, and like apparatus used in the sawmill and lumber industries. The processing of felled trees into finished lumber requires or desirably includes a large amount of conveyor movement of logs and log products, usually for the purpose of reducing manual labor costs. In the prior art such conveyor devices have commonly included parallel endless loops of roller chain which slide atop rails or like surfaces as they are driven in unison by sprockets to carry pieces of lumber. It is difficult to adequately or even appreciably lubricate either the roller chains or the surfaces upon which they ride, since they tend to become covered with mud, wood chips or other debris. Thus the side plates of roller chains used in such a fashion are subject to substantial wear. A primary object of the invention is to provide a chain arrangement for lumber conveyor devices which is much less subject to wear. Roller chains are also expensive to fabricate, and another object of the invention is to provide a chain arrangement which may use a less expensive form of chain. Lumber handling procedures frequently subject the roller chain arrangements of the prior art to large shock or impact loads, as well as substantially continuous friction, and such shock or impact loads often damage roller chains, making them unusable. A further object of the present invention is to provide a chain arrangement for lumber conveying which can withstand much greater shock loading without damage.

Other objects of the invention will in part be obvious and will in part appear hereinafter.

The invention accordingly comprises the features of construction, combination of parts, which will be exemplified in the constructions hereinafter set forth, and the scope of the invention will be indicated in the claims.

For a fuller understanding of the nature and objects of the invention reference should be had to the following detailed description taken in connection with the accompanying drawings, in which.

Figure 4:
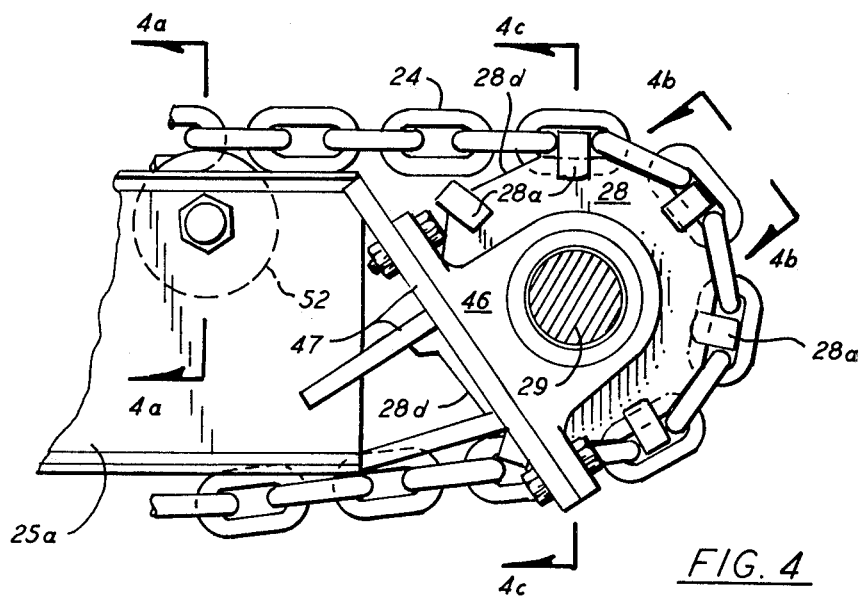
Figure 4C:
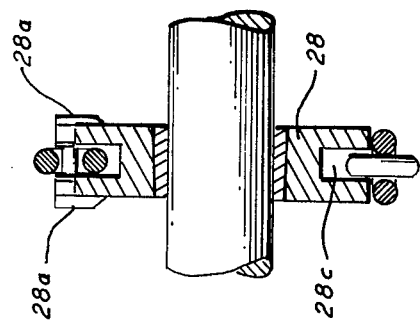
Figure 4B:
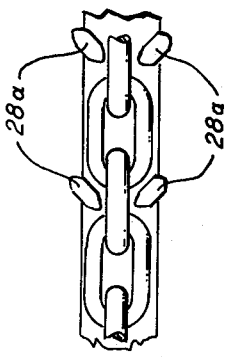
Figure 4A:
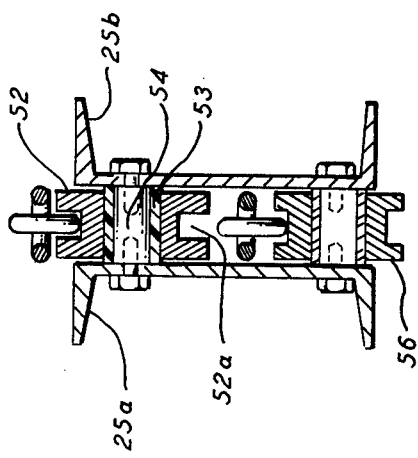

FIGS. 4a, 4b and 4c are views taken respectively, at lines 4a—4a, 4b—4b, and 4c—4c in FIG. 4.

Figure 5:
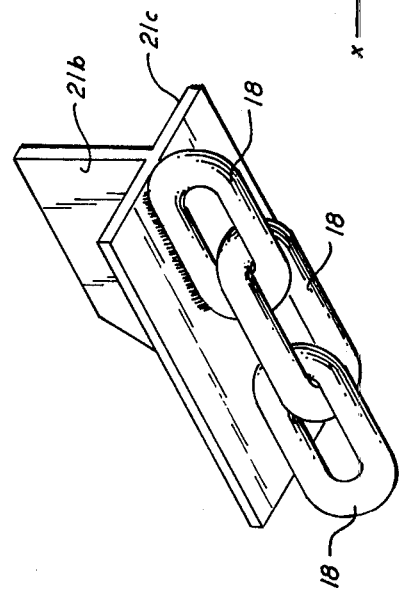

FIG. 5 is an isometric view of a portion of the apparatus.

Figure 6:
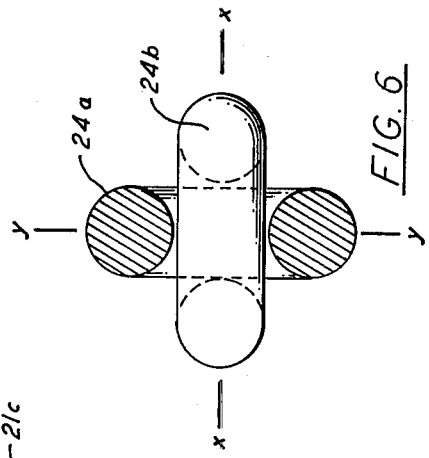
Figure 6A:
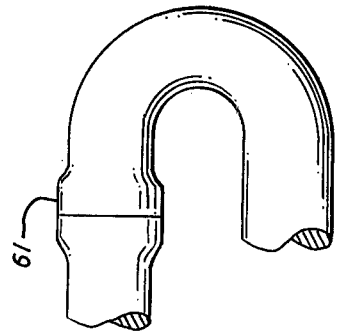

FIGS. 6 and 6a are views illustrating chain link portions of the invention.

Figure 1:
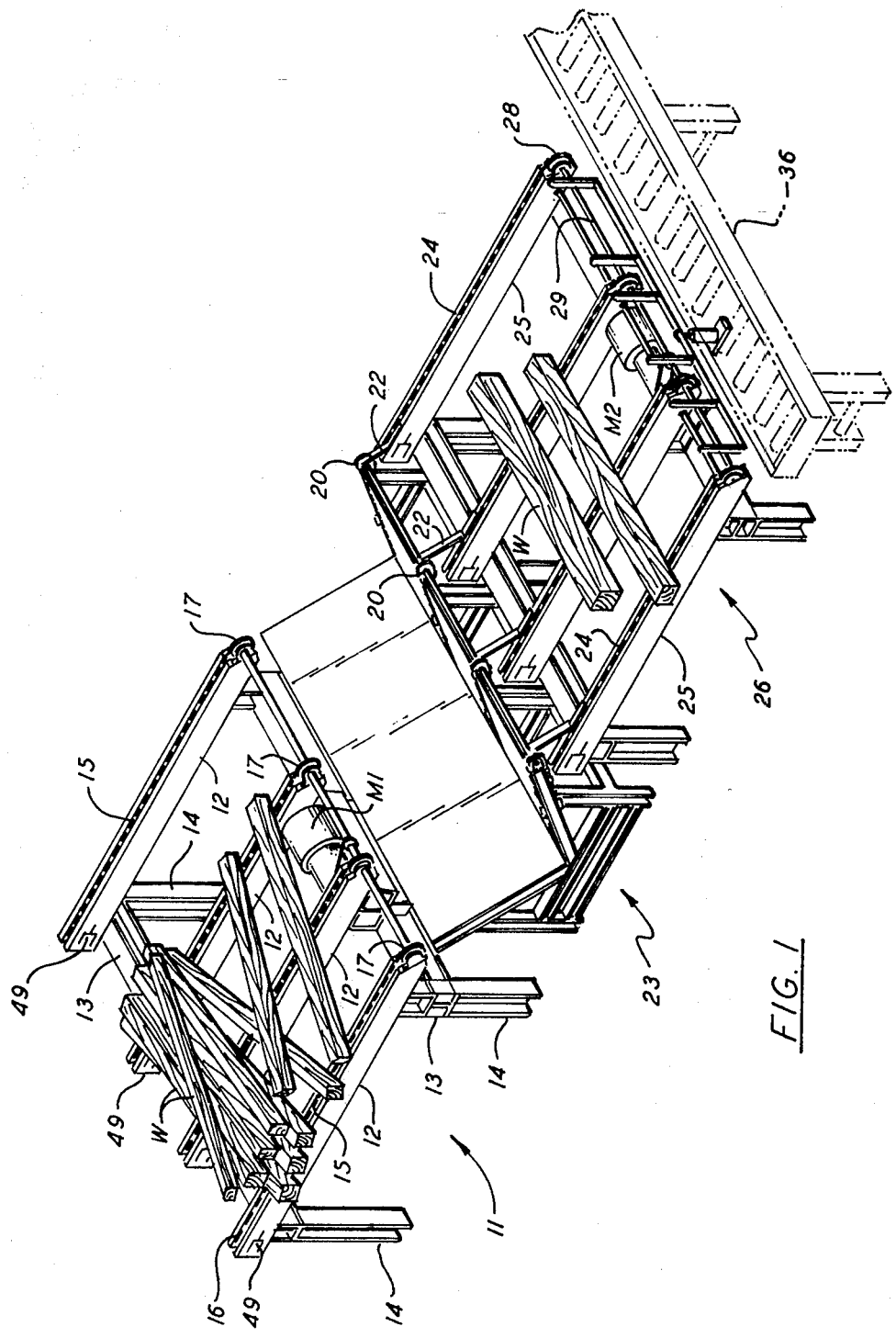
FIG. 1 is a perspective view of one form of lumber handling device which incorporates the present invention.

As shown in FIG. 1 an input conveyor 11 comprises a plurality of parallel spaced-apart longitudinal rails 12,12 extending between and supported atop a pair of laterally-extending members 13,13 which are supported above the floor by legs 14,14. A respective endless loop of chain 15 extends along the length of each rail 12, each chain 15 being trained around a respective rear idler roller 16 and a respective forward sprocket 17. Chains 15, 15 are driven by forward sprockets 17,17 by a motor which drives shaft 35 to which each of sprockets 17 is affixed, via a gearbox not visible in FIG. 1. Heavy lumber slabs or cants are placed atop the rails, typically by use of a fork-lift truck, by other material-handling equipment, or even manually in some applications. In FIG. 1 a load of cants W, W are shown situated atop the rails. Further details of chains 15 and means for supporting and driving these chains will become clear as the description proceeds, as chains 15 may be identical to other chains to be described in detail below. In typical applications, the chains 15 are driven at speeds of the order of 10 to 15 feet per minute.

Figure 2:
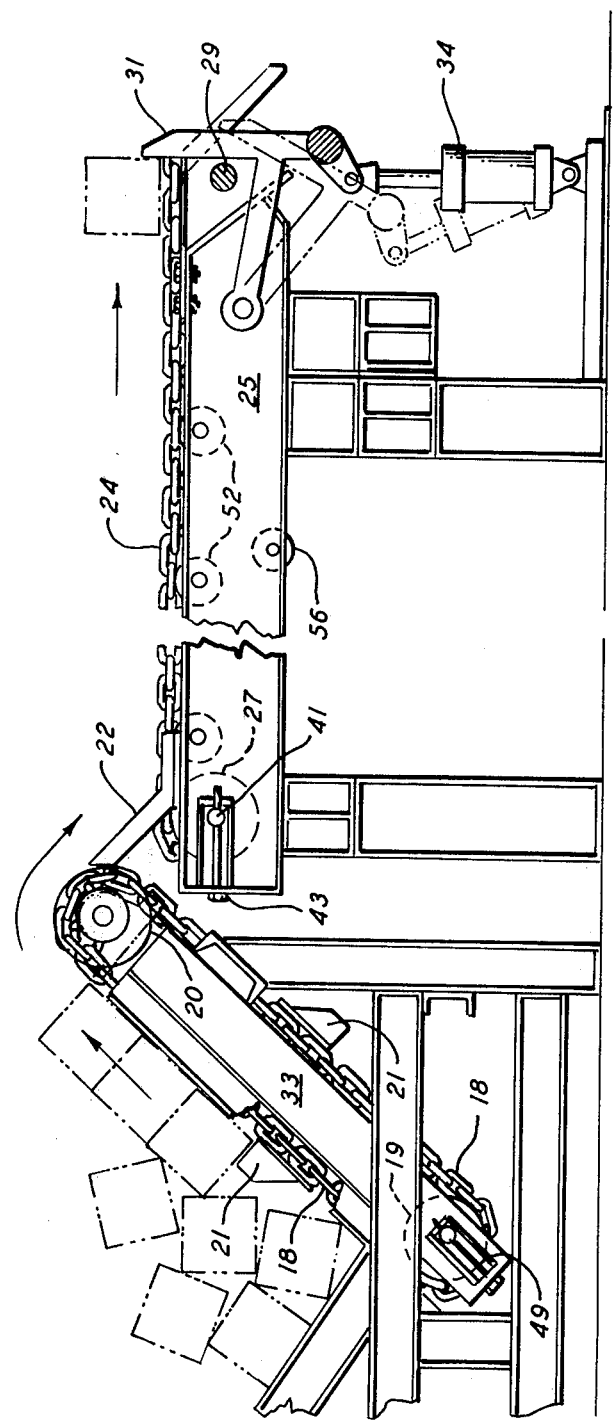
FIG. 2 is a side elevation view of a portion of the assembly shown in FIG. 1.

The advancement of chains 15 conveys the wood pieces to one edge of the V-shaped trough of an unscrambler 23, so that the pieces fall from the chains 15 at sprockets 17 and slide toward the bottom of the unscrambler trough. A second plurality of endless chains 18, 18 extend up the output side of the unscrambler trough, being trained around lower idler rollers 19,19 and upper sprockets 20,20, which are carried at opposite ends of a plurality of unscrambler guide rails 33,33 (FIG. 2). Each of chains 18 carries one or several projecting dogs 21,21 (FIG. 2). The dogs on the chains 18 are "synchronized" i.e. located at similar positions around the loop formed by each chain 18, so that they move slantingly upwardly and downwardly in unison. Further details of chains 18 and means for supporting and driving these chains will become clear below from a detailed description of similar chains to be discussed below. A number of pieces of wood may lie in the unscrambler trough at a given time. As chains 18 are advanced, one or several of the lower pieces will be engaged by the dogs and moved upwardly and over sprockets 20, after which they will slide down bars 22,22 to lie above the chains 24,24 carried on rails 25,25 of an out-feed deck 26. Thus the function of the unscrambler device is to receive a stack or load of pieces, and to feed them one-by-one onto the out-feed deck 26.

Each chain 24 is trained around a respective idler roller 27 (FIG. 3) at the entry end of the out-feed deck 26 and a respective sprocket 28 (FIG. 4) at the exit end of the out-feed deck 26. Sprockets 28 are carried on shaft 29 and driven in unison by motor M2 (FIG. 1) which drives shaft 29. Chains 24 carry pieces on the deck 26 forwardly until the forwardmost piece encounters a plurality of upstanding stop arms 31,31. Stop arms 31 extend radially from a shaft 32 below deck 26. By actuation of a push-button switch (not shown) an operator may activate ram 34 to temporarily pivot arms 31 downwardly, allowing chains 24 to dump a cant or the like on a further conveyor 36, which is shown in phantom in FIG. 1, and which may typically comprise the in-feed conveyor of a trim and cut-to-length cross-cut saw (not shown.).

Figure 3:
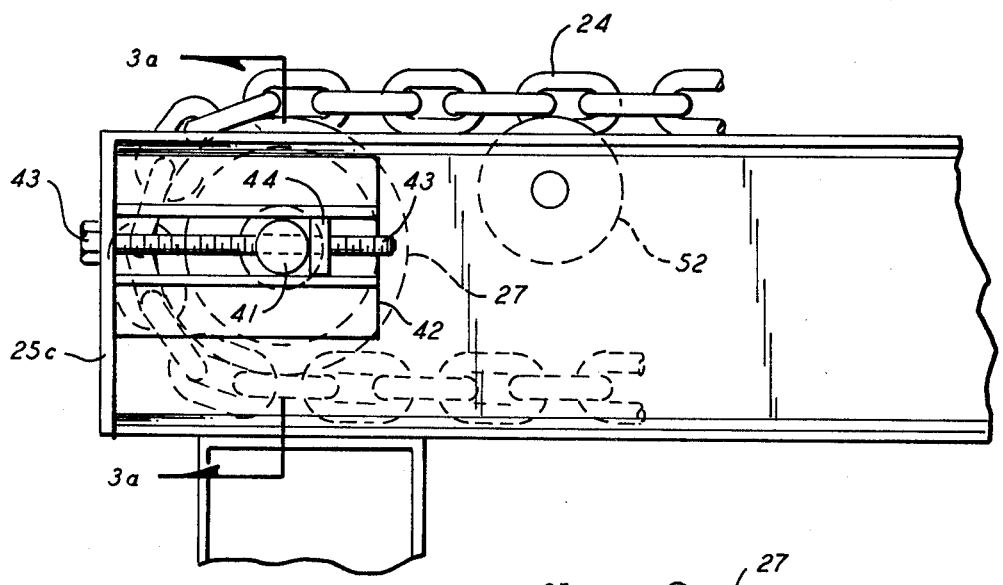
FIGS. 3 and 4 are enlarged views of portions of FIG. 2.
Figure 3A:
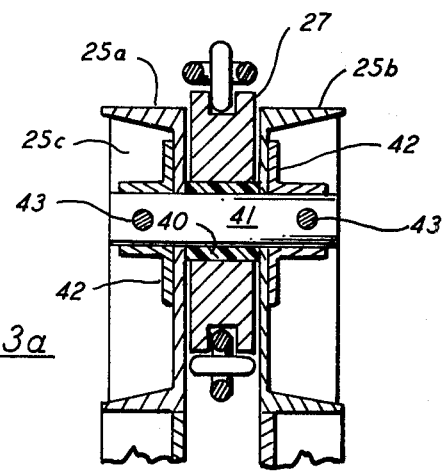
FIG. 3a is a cross-section view taken at lines 3a—3a in FIG. 3.

As shown in FIG. 3a, each rail 25 may comprise a pair of oppositely-facing channel members 25a,25b having a respective idler roller 27 journalled therebetween. Idler roller 27 is carried in a sleeve bearing 40 on a shaft 41, which passes through elongated slots in members 25a,25b. The ends of shaft 41 are restrained against vertical movement by four angle pieces 42, 42. A pair of bolts 43,43 which extend through holes in a rear end plate 25c of the rail pass through opposite ends of shaft 41 and are threaded into nutlike plates 44. It will be seen that by rotating bolts 43, each shaft 41 may be moved leftwardly in FIGS. 2 and 3, thereby tightening the chains 24. As best seen in FIG. 4, each forward sprocket 28 is carried on shaft 29, which is journalled in a pillow-block or pedestal bearing 46 carried at the forward end of each rail 25 on a bracket 47. The inclined chains 18 on the unscrambler 16 and the chains 15 on the in-feed conveyor are provided with similar chain-tightening assemblies generally indicated at 49,49 in FIGS. 1 and 2. The chains 15 and 18 may be identical in principle to chains 24.

As is evident from the Figures chain 24 comprises a plurality of identical interconnected generally oval-shaped links. Chain of the type illustrated is commonly used in barn-cleaner equipment and for various other applications. Chain having a hardness of the order of 65 Rockwell C is preferred, and it is desirable that the chain be pre-stretched to near its elastic limit to remove most of its "give". Each link comprises an elongated closed loop formed from bar stock of circular cross-section, with the inner radius at each end of each loop slightly exceeding the diameter of the circular cross-section. In one successful embodiment of the invention, chain formed from $\frac{5}{8}$ inch round bar stock to form generally oval links $2\frac{1}{4}$ inches wide and 3 inches long were used, such chains having a working tensile strength exceeding 9,000 pounds. In another successful embodiment, links with a width of $1\frac{7}{8}$ inch and a length of $2\frac{7}{8}$ inches were formed from $\frac{1}{2}$ inch round stock. It will be apparent that the dimensions may vary appreciably in various applications. With each idler roller 27 and each sprocket 28 arranged in a vertical plane, and with tension applied to the chains 24, it will be apparent that alternate links in each chain 24 will lie in respective vertical and horizontal planes as shown in FIGS. 3 and 4. Hardened steel teeth 28a,28a having a shape best seen in FIGS. 4 and 4b are provided on each drive sprocket 28, spaced around the drive sprocket 28 at peripheral distances corresponding to the length of two links. Drive sprocket teeth 28a are preferably manganese steel welded to a hot-rolled steel sprocket. As sprocket 28 is driven clockwise in FIG. 4, it will be seen that successive pairs of teeth 28a will engage the rounded rear courses of those links lying in horizontal planes. The periphery of each drive sprocket 28 in between successive pairs of teeth is flat or straight, as shown at 28d in FIG. 4, and as the initially horizontally-lying links are driven around the drive sprocket, the sides of those links will be supported by flat edges 28d, thereby preventing any twisting of the chain, and thereby maintaining the other links in the vertical plane. As shown in FIG. 4c, each drive sprocket 28 includes an annular central recess 28c between two side flanges upon which the teeth 28a are carried. It will be seen that with the arrangement shown, the links which lie in vertical planes may pass around the drive sprocket without touching the drive sprocket. As a chain 24 is advanced by a sprocket 28, a slight relative rotation will occur between a given vertically-lying link and the immediately following horizontally-lying link until the latter engages a pair of flat sides 28d of the sprocket. No relative rotation then will occur between that pair of links during the major travel of that pair around the drive sprocket, and then a slight relative rotation will occur between the pair as they reach and leave the bottom of the sprocket. Similarly, a slight relative rotation will occur between each sprocket tooth 28a and a horizontally-lying link only as they initially come into engagement and later disengage, but relative rotation or frictional rubbing will not occur during most of their engaged travel around the drive sprocket. Since little frictional movement occurs between pairs of links, and between the horizontal links and drive sprocket teeth, the vertically-lying links need not frictionally engage the drive sprocket, and because the links and teeth may be made of hardened steel, very little wear occurs in the assembly, and no lubrication of the chains is necessary for long life.

Further, in accordance with an important feature of the invention, the upper course of each chain 24 is supported by a plurality of rolls 52,52. As seen in FIG. 4a, each roll 52 is journalled by means of a respective bearing 53 on a respective stub shaft 54 affixed between a pair of guiderail side members 25a,25b. Each roller 52 is provided with an annular central recess 52a between a pair of side flange portions. The upper portions of rollers 52 extend above the upper faces of rail members 25a,25b. Thus even when heavy wood loads are carried atop the chains, no sliding friction occurs between a chain 24 and any rail member, which serves to greatly lengthen the life of the apparatus. Because the chains have great tensile strength, and are not damaged by twisting forces, large shock or impact loads which tend to damage roller chains do not damage chains of the type shown.

In a typical application I prefer to space rollers 52 at about one foot intervals along rails 25, and to tighten each chain 24, by means of the previously-described chain-tightener assemblies, until the chain is snug, with a little sag in each chain between the rollers. Depending upon the length of the out-feed deck, and hence the distance between the sprockets 28 and idler rollers 27, it is sometimes deemed desirable to support the lower course of each chain 24 with one or more idler rollers. One idler roller so arranged to support the lower course of the chain is shown at 56 in FIG. 4a. Supporting the lower chain courses in such a fashion decreases the load which chain weight applies to the bearings of shaft 29 and those of idler rollers 52. The spacing between any rollers 56 supporting the lower chain courses ordinarily may be much greater than that between rollers 52, and in applications involving decks of limited length, no rollers 56 need be used.

As previously suggested, chains 15 and 18 may take the same form as chains 24. It will be apparent that drive sprockets 17 and 20 may take the same form as sprockets 28, and chains 15 and 18 may be supported above rails 12 and rails 33 by rollers 52 in the same fashion as chain 24. As shown in FIG. 5, each dog 21 on a chain 18 may comprise a base plate portion 21c welded to one of the vertical links of chain 18, and an upstanding plate portion 21b.

As shown in FIG. 6, a pair of adjacent links 24a,24b of chain 24 will lie substantially perpendicularly to each other. In FIG. 6 link 24a may be deemed to lie in a vertically-extending "plane" defined by the axis y—y, and line 24b to lie in a horizontally-extending plane defined by the axis x—x. The chains are made using resistance-welding in accordance with known chain-making procedures, providing links which have enlarged diameter joint or weld portions of the nature shown at 61 in FIG. 6a. I prefer to orient each chain so that the enlarged-diameter portions of the links lying in vertical planes are all radially outside, so that only normal-diameter link portions extend into roller recesses 52a and sprocket recesses 28e as the chains are advanced.

While drive sprockets 17,17 and 28,28 have been shown situated at the forward ends of conveyor sections 11 and 26, it should be apparent that they could instead be situated near the rear ends, with their associated idler rollers located at the forward ends. The rollers 52 carried on alternate rails 25 are preferably aligned with each other, with the rollers 52 on the other rails staggered midway therebetween.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawings shall be interpreted as illustrative and not in a limiting sense.

The embodiments of the invention in which an exclusive property or privilege is claimed are defined as follows:

1. Lumber conveyor apparatus for conveying elongated wooden members such as logs, cants, slabs or flitches, comprising, in combination: a plurality of spaced-apart rail means extending parallel to each other; a respective idler roller journalled on each of said rail means adjacent one end of said rail means; a respective drive sprocket journalled on each of said rail means adjacent the other end of each of said rail means; a respective endless chain means trained around the idler roller and the drive sprocket of each of said rail means and including respective upper and lower chain courses, said upper chain courses extending in substantially the same plane in substantially straight lines between their respective idler rollers and drive sprockets; means for rotating said drive sprockets; and a respective upper roller means journalled on each of said rail means between said upper and lower chain courses and between respective idler rollers and drive sprockets to support the upper course of a respective one of said chain means, the upper course of each of said chain means being supported solely by a respective idler roller, respective drive sprocket, and respective upper roller means, each of said chain means comprising a plurality of interlinked generally-oval links of circular cross-section having adjacent links lying in planes which are substantially perpendicular to each other.

2. Apparatus according to claim 1 wherein each of said drive sprockets carries teeth adapted to engage only alternate links of a respective one of said chain means.

3. Apparatus according to claim 1 wherein each of said idler rollers comprises a pair of annular flanges having an annular recess therebetween.

4. Apparatus according to claim 1 wherein each of said rail means comprises a respective pair of spaced-apart structural members extending parallel to each other, and wherein the idler roller and the drive sprocket carried on each of said rail means are journalled between the pair of structural members of the rail means to support the upper courses of the chain means with the upper edges of said upper courses above the upper edges of said structural members.

5. Apparatus according to claim 1 wherein each of said idler rollers is journalled on a respective shaft, and wherein said apparatus includes respective means carried on said rail means for urging said respective shafts toward said one end of each of said rail means to apply tension to said respective chain means.

6. Apparatus according to claim 1 in which each of said upper roller means comprises a plurality of rollers spaced apart from each other and engaging the upper course of a respective one of said chain means.

7. Apparatus according to claim 1 which includes a respective lower roller means journalled on each of said rail means vertically below said lower chain courses and horizontally between said idler roller and drive sprocket to support the lower course of a respective one of said chain means.

8. Apparatus according to claim 1 wherein each of said drive sprockets comprises a generally disc-shaped member having a pair of side flanges and a peripheral recess between said side flanges, each of said side flanges having a plurality of peripherally-spaced flat edges and a drive tooth situated between adjacent pairs of said flat edges.

9. Apparatus according to claim 1 wherein each of said chain means includes a plurality of dog means affixed respective links of said chain means, each of said dog means being carried above the upper surfaces of said rail means when transported along the upper course of its respective chain means.

10. A lumber conveyor for conveying elongate wooden members without friction between said members and stationary conveyor structure, with minimum sliding friction between member-supporting portions and stationary portions of said conveyor, and wherein said member-supporting portions are arranged to withstand large impact loads if said wooden members fall or are dropped on them, comprising, in combination: a plurality of member-supporting conveyor portions each comprising an endless loop of link chain having hardened metal links, adjacent links of said link chain being angularly movable relative to each other through limited amounts in three dimensions; a plurality of drive sprockets and a plurality of idler rollers, each of said endless loops of link chain being trained around a respective one of said drive sprockets and a respective one of said idler rollers; fixed support means for rotatably supporting said drive sprockets and said idler rollers so that the upper edges of upper courses of said loops of link chain extend parallel to each other substantially within a common plane situated above said support means, whereby said elongate wooden members can lie across and be supported and transported by said upper courses without resting or rubbing on said support means or structure other than said chains, and whereby said upper courses of link chain may flex by relative angular movement of adjacent links in one or more of said three dimensions to resist impact loads if said wooden members fall on said upper courses.

11. A lumber conveyor according to claim 10 having at least one dog affixed to one link of each of said chains, and wherein each of said chains is tensioned to provide a small amount of chain slack, whereby each of said dogs will normally extend in a reference direction as said one link passes along the upper course of said chain but may be temporarily deflected from said reference direction by a wooden member which falls on it.

12. The method of conveying elongate articles of lumber which comprises supporting said articles upon the upper courses of a plurality of parallel spaced-apart endless loops of link chain trained around respective drive sprockets and idler rollers to support said loops of link chain with the upper courses thereof lying substantially in a common plane, with at least one dog extending from each of said loops of link chain; applying tension to said chains so that said dogs normally extend in a reference direction from said chains to engage said elongate articles but may be deflected from said reference direction by the imposition of sidewise or torsional loads on said dogs, and driving said chains to advance said dogs repetitively along said upper courses.

13. The method according to claim 12 wherein said step of supporting comprises supporting said upper courses of said loops at an inclined angle, thereby to raise said articles as they are transported along said upper courses.

14. The method according to claim 13 which includes gravity-feeding a plurality of said articles of lumber atop the lower ends of said inclined upper courses of chain, whereby said dogs engage lower ones of said plurality of articles and move them upwardly along said upper courses out from beneath others of said plurality of articles.

15. Conveyor apparatus, comprising, in combination: a plurality of idler rollers spaced apart in a lateral direction and journalled for rotation about a common axis; a plurality of drive sprockets spaced apart in said lateral direction with the same lateral spacing as said idler rollers and carried on a shaft means extending in said lateral direction to be rotated by rotation of said shaft means; means for rotating said shaft means; a plurality of endless chains, each of said chains being trained around a respective idler roller and a respective drive sprocket and including upper and lower courses extending in substantially straight lines between the respective idler roller and respective drive sprocket, each of said chains comprising a plurality of generally-oval links having a first group of alternate links lying in planes normal to said common axis and the axis of said shaft means and a second group of alternate links lying in planes parallel to said axes; and a plurality of dog means extending generally perpendicularly to said axes affixed to selected links of said first group on respective ones of said chains, said apparatus including roller means for supporting the upper course of each of said chains in between the idler roller and the drive sprocket around which the chain is trained, the upper course of each of said chains being supported solely by a respective idler roller, drive sprocket and roller means.

16. Conveyor apparatus, comprising, in combination: a plurality of idler rollers spaced apart in a lateral direction and journalled for rotation about a common axis; a plurality of drive sprockets spaced apart in said lateral direction with the same lateral spacing as said idler rollers and carried on a shaft means extending in said lateral direction to be rotated by rotation of said shaft means; means for rotating said shaft means; a plurality of endless chains, each of said chains being trained around a respective idler roller and a respective drive sprocket and including upper and lower courses extending in substantially straight lines between the respective idler roller and respective drive sprocket, each of said chains comprising a plurality of generally-oval links having a first group of alternate links lying in planes normal to said common axis and the axis of said shaft means and a second group of alternate links lying in planes parallel to said axes; and a plurality of dog means extending generally perpendicularly to said axes affixed to selected links of said first group on respective ones of said chains, said apparatus including a plurality of rail means spaced apart in said lateral direction and extending parallel to each other, said idler rollers being journalled in respective ones of said rail means adjacent a first end thereof, the upper edges of said upper chain courses being situated above the upper surfaces of said rail means.

* * * * *